United States Patent [19]

Bock et al.

[11] Patent Number: 4,604,807
[45] Date of Patent: Aug. 12, 1986

[54] ELECTRONIC FOOT MEASURING APPARATUS AND METHOD

[75] Inventors: Harry S. Bock, Inverness; Stanley O. Gregory, Elgin; F. Philip Gardner, McHenry; Russell H. Reid, Bolingbrook, all of Ill.

[73] Assignee: Interco, Incorporated, St. Louis, Mo.

[21] Appl. No.: 770,966

[22] Filed: Aug. 30, 1985

Related U.S. Application Data

[63] Continuation-in-part of Ser. No. 685,137, Dec. 21, 1984, Pat. No. 4,538,353.

[51] Int. Cl.$^4$ ............................................... A43D 1/00
[52] U.S. Cl. ........................................ 33/3 C; 33/3 B; 33/515
[58] Field of Search ................ 33/3 C, 3 B, 3 R, 3 A, 33/4, 515

[56] References Cited

U.S. PATENT DOCUMENTS

| | | | |
|---|---|---|---|
| 2,975,519 | 3/1961 | Berlin, Jr. et al. | 33/3 B |
| 3,173,746 | 3/1965 | Rockmore | 33/3 A |
| 3,277,779 | 10/1966 | Doran | 33/3 B |
| 3,408,740 | 11/1968 | Saad et al. | 33/3 R |
| 3,457,647 | 7/1969 | Cohen et al. | 33/3 R |
| 4,294,014 | 10/1981 | Baumann et al. | 33/3 B |
| 4,395,826 | 8/1983 | Bidegain et al. | 33/3 C |

Primary Examiner—Willis Little
Attorney, Agent, or Firm—Robert A. Brown

[57] ABSTRACT

Apparatus for electronically measuring the size of a foot for determining a properly fitted specific shoe size. A light source is arranged to cause an outline of a foot to be delineated upon a translucent panel. Light energy is directed from the panel through photo optic means to an electronic device containing means for inherently discriminating impulses of energy into a distinct white/black status to produce an electronic duplicate of the foot outline. The electronic image of the foot is processed within the apparatus to determine an accurately fitted size of shoe for the measured foot. Video display means is provided so that a customer may view the process of measurement of the shoe size and be informed of the precisely determined size of shoe to fit the customer's measured foot. Specific hardware is provided in the form of schematic diagrams for defining the operation of the invention.

15 Claims, 12 Drawing Figures

ELECTRONIC FOOT MEASURING APPARATUS AND METHOD

This application is a continuation-in-part of application Ser. No. 685,137 filed Dec. 21, 1984, U.S. Pat. No. 4,530,353.

BACKGROUND OF THE INVENTION

The present invention relates generally to principles of photogrammetry, electronics and computer technology and more particularly to means for measuring the human foot in order to determine a specific shoe size with a degree of accuracy considerably greater than that achieved by technology of the prior art.

More specifically, this invention relates to an apparatus containing a light source which is arranged to cause an outline of a foot to be displayed upon a translucent screen whereby photo-optic principles are employed to direct an image of the outline to the surface of an electronic device containing a monolithic array of light sensitive semiconductor elements which sense strong or weak impulses of energy and inherently discriminate this information into a distinct white/black, light/dark status or relationship to create an electronic duplicate of the foot outline. The electronic image of the foot can then be processed according to a predetermined algorithm so as to determine the shoe size that would provide the best fit. It will be noted that the number of light sensitive elements available with the advanced technology described herein is well beyond that achieved by the prior art. The resolution of status thus obtained accomplishes a precision of measurement never before made possible.

In the past, a number of patents have been issued relating to apparatus for determining sizes of shoes. For example, U.S. Pat. No. 2,975,519 to Berlin confronts the problems of selling shoes by catalog or retail outlet and describes an apparatus wherein a light source is directed toward an opaque plane containing a series of holes strategically placed so as to correspond to the longest and widest portions of an average foot of various sizes. It should be noted that an improper size would be indicated if the longest or widest portion of a given foot does not conform to this average. Thus, a foot of average proportions, even though properly placed in the apparatus, could prevent the light rays from reaching some of the photo-voltaic cells under each of the holes. An arrangement of stepper relays, linkages and print wheels is then used to print the shoe length and width, as determined by the light and dark photo cells, on an order blank. The customer then completes the order blank with his name, address, desired shoe style and color. It is noted that this invention projects a light source in a direction vertical to the plane of the bottom of the foot as opposed to parallel to that plane.

Cohen and Blivice, in U.S. Pat. No. 3,457,647 point out difficulties encountered when using mechanical means that physically touch a foot and compress human tissue. The problem is exacerbated because of further difficulty in determining the exact moment when physical contact has been made between the mechanical means and the foot.

In U.S. Pat. No. 3,328,882, a reference closely related to Cohen, et al '647, a number of light sources and corresponding photo cells are placed in a plane parallel to the bottom surface of the foot and arranged in a matrix such that one set of lights and photo cells is along the length axis of the foot and another set is along the width axis. A properly placed foot would then block some of the cells in each axis and this information is then used to determine the proper length and width shoe.

Cohen et al '647 then state that the large number of photo cells are prohibitive from a cost standpoint and describe an alternate apparatus where only one photo cell (or light source, depending on relative cost) is used per axis and it is moved by motor means along its respective axis until the light path is no longer blocked by the foot and the motor and photo cell is stopped at this position. The position of both motors is tracked by a moving brush contact on a series of contact segments on a printed circuit board surface. The contact closures thus obtained are then encoded by use of a diode matrix and discrete electronic components to display a shoe size and width by illuminating a corresponding set of lights on the apparatus panel. A special lamp indicates sizes greater than 15 in length or width of EEE.

Greensides U.S. Pat. No. 3,931,681 uses virtually all mechanical means to determine length, width and girth at a point 72.5% of the length as indicated by motorized pointers on a tape measure type scale. This arrangement suffers from the previously mentioned problems of determining an exact point of physical contact on a foot and requires a large number of moving parts.

Baumann, U.S. Pat. No. 4,294,014 states that all of the previous art suffers from the shortcomings of numerous moving parts (stepper relays, printers, brush contacts, motors, etc.) all of which are subject to wear, faulty operation and ultimate failure. Baumann, '014 pinpoints the major source of measurement error shown in prior art as interference caused by light sources adjacent to the light source corresponding to a particular photo cell and the errors caused by effects of incident light and diffraction.

Baumann '014 suggests other forms of radiant energy may be used, such as electromagnetic or sound, and describes a preferred embodiment consisting of infra-red emitters and opposing infra-red sensors arranged in a matrix corresponding to the length and width of the foot and in a plane parallel to the bottom of the foot. This is similar to Ser. No. 346,601 mentioned by Cohen and Blivice, now U.S. Pat. No. 3,328,882, but is now more practical because present day technology has made infra-red devices available at a cost which makes this configuration attractive. This concept would be prone to the error sources described by Baumann except for the sophisticated time division multi-plex and modulation techniques employed whereby only one light source is activated at any one time and the light source is modulated in such a way that only receivers modulated in the same manner will respond to the light source. These techniques are now common and practical in optical emitting and sensing applications. It should be noted the Baumann apparatus measures a shoe size based only upon the maximum length and width measured, with no determination made as to where exactly the maximum occurs.

It is further noted that none of the prior art is suitable for using computer interface technology to measure the size of a foot and also to maintain inventory, predict market trends, automate ordering, or in general acquire data for statistical purposes to advance the art of shoe making.

SUMMARY OF THE INVENTION

Accordingly, it is a primary object of the present invention to provide means for measuring the form of a human foot and process data so obtained into a stored information bank whereby a shoe size is determined that fits properly the human foot being measured.

It is a further object of this invention to provide a foot measuring apparatus which utilizes electronic and computer technology to avoid errors caused by misalignment of mechanical parts that must be moved and positioned about a human foot to obtain a measurement of foot size.

An additional object of this invention is to provide a light source for projecting collimated rays of light for illuminating a human foot and thereby cast a shadow on a translucent panel surface which accurately replicates the outline of the illuminated foot.

Another object of this invention is to provide an association of optical and electronic technologies to convert light energy representing the outline of a human foot into electrical energy that defines with precision the shoe size of the human foot.

It is still a further object of this invention to employ electronic computer and software technology to control operation of the apparatus so as to logically analyze human foot measurement data, compare that data to a plurality of shoe sizes and determine a properly fitted shoe size for a measured human foot.

It is still another object of this invention to provide means submitting computer foot measurement data to an electronic computer whereby an exact foot shape is developed for viewing on the screen of a cathode ray tube.

A further object of this invention is to provide reflective means for receiving rays of light projected from a light source and redirecting the light rays to means for analyzing and resolving the light rays into an accurately formed shape of a human foot.

An apparatus and method in accordance with the present invention comprise an enclosure, a light source for projecting collimated rays of light upon a human foot for delineating a shadow outline thereof, means for transferring the shadow outline to an optical image receiving means, electronic analytical means for receiving and resolving the shadow outline to reflect the exact shoe size of the foot, means for storing information relating to a plurality of shoe sizes, means for comparing the foot shadow outline with the plurality of shoe sizes and determining a shoe size that fits properly the human foot exemplified by the foot shadow outline, and means for informing a patron of a properly fitted shoe size that corresponds to the delineated human foot outline.

DESCRIPTION OF THE DRAWINGS

The foregoing and other characteristics, objects, features and advantages of the present invention will become more apparent upon consideration of the following detailed description having reference to the accompanying figures of the drawings, wherein.

DESCRIPTION OF THE PREFERRED EMBODIMENT

Figure 1:
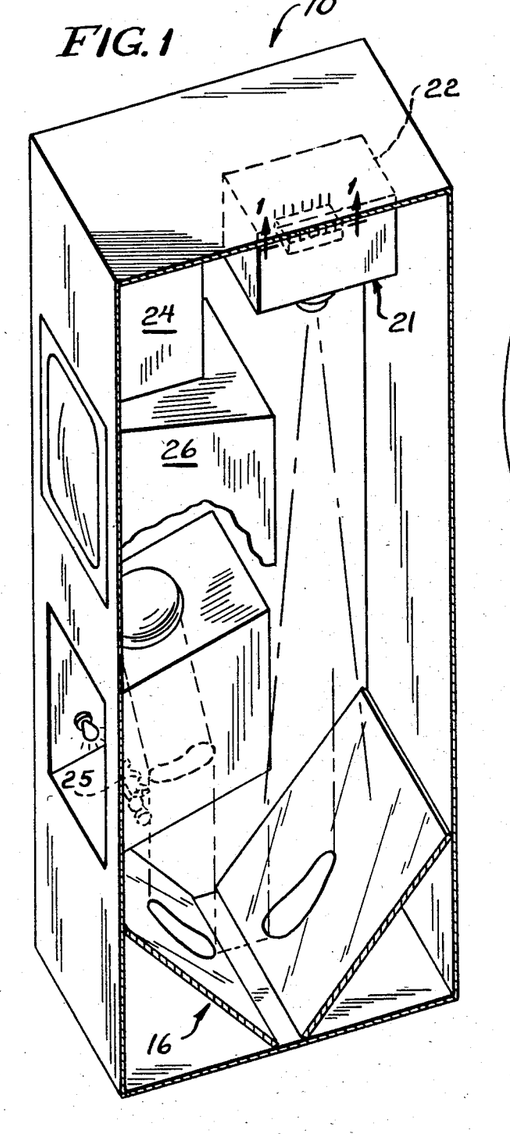
FIG. 1 is an isometric view of an enclosure containing the components of the present invention. A side panel is shown removed to display the interior details.
Figure 2:
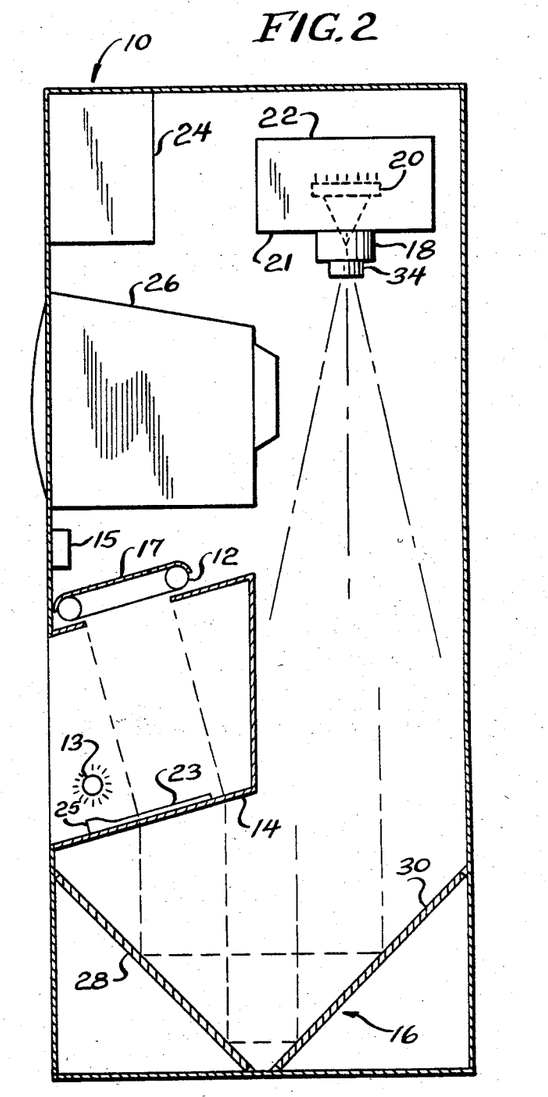
FIG. 2 is a side view of the enclosure which will be referenced to describe the physical and optical features and relationships of the main components of the invention.

An apparatus for measuring the size of a human foot for purposes of determining proper shoe size, generally identified by reference numeral 10 (FIGS. 1 and 2), comprises light source means 12 projecting parallel rays of light, translucent panel means 14 for describing the shadow of a foot placed upon the panel means 14, mirror means generally indicated by reference numeral 16 for redirecting the foot shadow into the field of view of an array scanner, generally identified by reference numeral 21. The array scanner 21 comprises optical means 18 for receiving the redirected foot shadow and focusing the shadow image onto the surfaces of a monolithic integrated circuit 20 comprising photo-sensitive elements which are then interrogated by microcomputer means 22 to determine their white/black or light/dark status. The microcomputer means 22 includes an internal software program means for executing a required algorithm. A peripheral I/O (Input/Output) device 24 provides means for communicating with the microcomputer 22, thus controlling execution, parameters, and accepting output information. A cathode ray tube video display 26 provides the means of displaying the processed foot image for viewing.

The peripheral input/output device 24 is depicted as a separate structural function for purposes of explanation and clarity but mainly to emphasize the point that the I/O device 24 may take many forms and not differ from the unique features and concept of this invention. Those skilled in the art will recognize that the I/O device could take the form of a simple "DUMB TERMINAL" as it is referred to in the industry, with pertinent instructions and parameters being entered manually, or it could take the form of a "SMART TERMINAL" or "CO-PROCESSOR" with the instructions and parameters being entered automatically on cue from a customer actuated switch. The CO-PROCESSOR could include storage and calculation facilities to accept output data and process that data to determine "best fit" shoe sizes and even communicate with a "HOST" computer to automatically enter and process the order for a pair or pairs of shoes. Finally, it should be apparent that the I/O device and the microcomputer 22 could be combined as one to perform any and all of the aforementioned functions, all of which are simple to implement with technology known to those skilled in the art.

The light source 12 is shown as a common circular flourescent light with a reflector 17 (FIG. 2); however, any source which produces similar collimated light can be used. The light source 12 is positioned in a plane parallel to the plane of the translucent panel 14 assuring that the collimated light rays are perpendicular thereto and that the resultant shadow on its surface is an accurate reproduction of the shape of a foot placed thereon. At least one, and as shown, two common incandescent light fixtures 13 are provided to ensure that a heel of a foot placed upon panel 14 is properly illuminated. Proper illumination of the heel ensures that a complete foot shadow outline is delineated throughout the periphery of a foot being measured including its heel that may be partially obscured from the light source 12 when a patron places a foot upon the panel 14. Regulating means 15 is suitably connected to the light sources 12 and fixtures 13 to provide a preselected degree and continuity of intensity of light.

The translucent panel 14 is of glass, plastic or other suitable material of sufficient strength and its surface is treated to produce a "ground" or "frosted" surface of optical quality. The panel 14 is fitted with a foot placement fixture 23 and includes a heel stop 25 (FIG. 2) so as to guide the foot to a proper but not critical position.

The mirror means 16 are positioned below the translucent panel 14 and include a first reflective mirror 28 and a second reflective mirror 30 angled precisely so as to cancel the length errors produced by the differences in light path lengths and at the same time redirect the undistorted foot image to a plane parallel to that of the receiving photo-sensitive array 20. Each mirror 28 and 30 has a single reflecting surface so as to eliminate the double image common with mirror systems. It is understood that the mirror means is required only to allow a convenient arrangement of the major components of the invention within the enclosure, and that a different arrangement could be used to eliminate the present use of mirrors and yet not be substantially different from the present invention.

Optical means 18 is a lens system not unlike a camera, of proper construction and focal length, and fitted with alignment, aperture and focal adjustments to project the foot image onto the surface of the photo-sensitive integrated circuit array 20 in the same manner as a photosensitive film surface of a common camera receives a photo image.

Figure 1A:
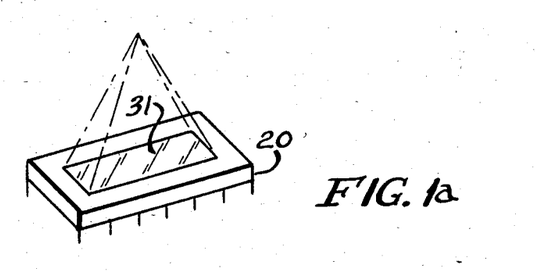
FIG. 1a is an isometric view of a portion of electronic means taken along lines 1—1 of FIG. 1 showing the underside of a light sensitive device containing semiconductor elements and forming a part of the present invention.

The photo-sensitive array 20 (FIGS. 1 and 2) makes use of the normal photo-sensitive characteristics of dynamic RAM memory technology, a transparent glass lid 31 (FIG. 1a) (as opposed to a standard opaque lid) and certain other enhancements made to optimize its performance in this application. The device is a 128×256 element array providing 32,768 photo-sensitive elements and each element is individually addressable using address schemes common to memory technology.

As each photo-sensitive cell is addressed, the white/black or light/dark status of that particular cell is available at the output terminal of the light sensitive array 20. Thus, by sequencing the address leads of the device, all 32,768 cells can be scanned and the light/dark status of each respective cell is indicated by a stream of serial data from the output terminal of array 20, thereby creating an electronic image which can be analyzed and processed by the microcomputer 22 as directed by an algorithm implemented in software within the microcomputer 22.

It will be obvious to those skilled in the art, that the photo-sensitive array 20 described in the preferred embodiment is representative of but one of a class of these devices and that the invention described herein is not limited to the use of that device and the use of any other similar device is only a matter of implementation details.

The cathode ray tude video display 26 (FIGS. 1 and 2) is a standard type monitor and has no limitations with respect to resolution because it is used only as a visual display for the customer and does not affect accuracy of measurements. Input signals containing the foot image are required to be in the composite video form only because of the implementation of the preferred embodiment, but other signal forms such as a standard RGB (red-green-blue) could be implemented and not deviate from the unique concept of the invention. The use of a color display and color compatible signals allows adjustment of the image and background colors for maximum effectiveness and sales impact.

Figure 3:
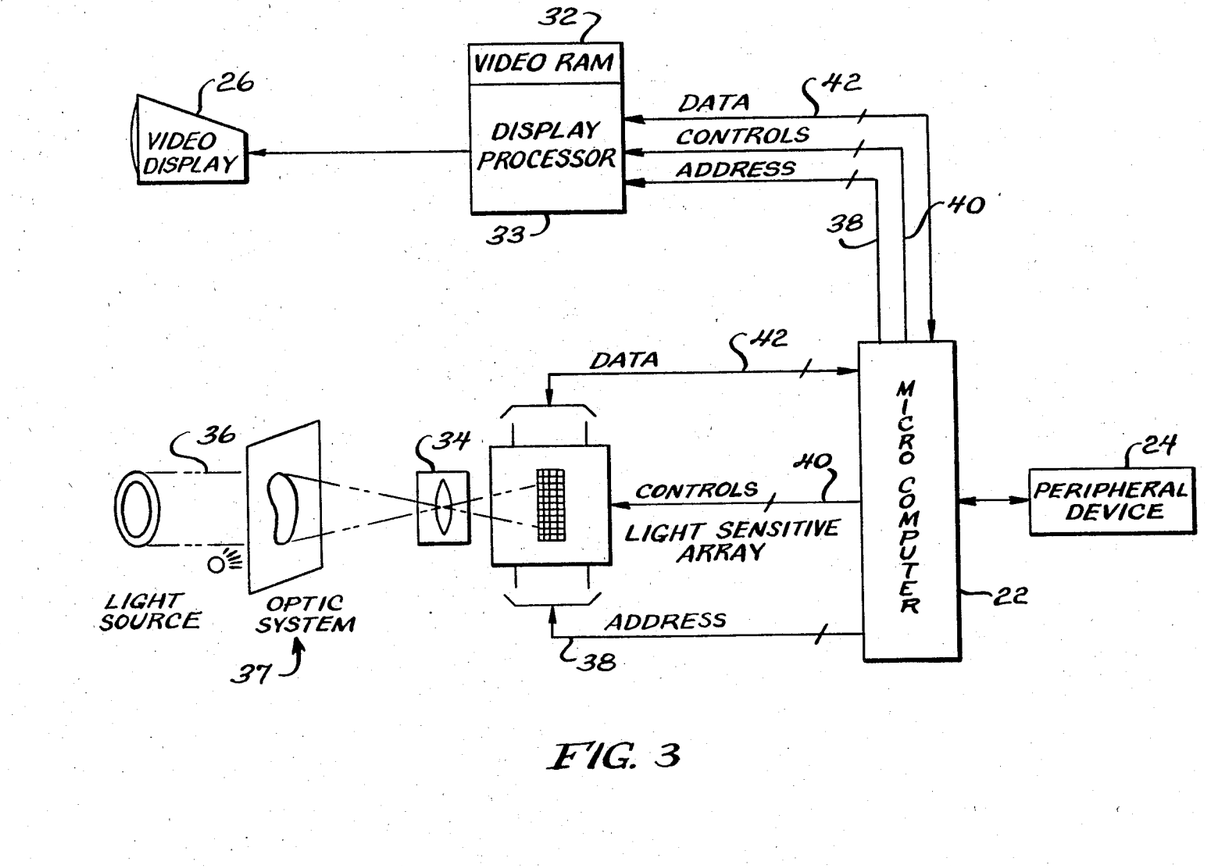
FIG. 3 is a block diagram of the subject invention which depicts each of the essential functions of the invention and shows the interface between the optical and the electronic means of the invention.

The block diagram of FIG. 3 generally presents the main elements of the invention and indicates the flow of information and control signals among them and also depicts the transformation of light rays containing intelligence representing the shape of a foot, into electrical signals which can be analyzed and manipulated so as to extract that intelligence and convert it to a form relevant to the primary object of this invention; i.e., determining foot size.

As further described, the invention (FIG. 3) comprises the source 12 of collimated light rays 36; a generally referenced optic system 37, including the translucent panel 14, mirrors 28 and 30, and a lens assembly 34; the array scanner 21; including the optical means 18, the light sensitive array 20, and the microcomputer 22; the peripheral I/O device 24 for input parameters and output data; a video ram 32 and a display processor 33 to store the image to be displayed and to output that image in a composite video format compatible with contemporary television type monitors, and finally the video display device 26 to convert the composite video signals representing the image to a visible image suitable for customer viewing.

It is noted that the preferred embodiment describes a television type monitor as the video display only because that type is generally available and commonly used, but it is not intended to preclude other present or future types of video display such as liquid crystal (LCD), vacuum flourescent (VF), or the like, which could be adapted for this purpose by those with a knowledge of that technology.

Describing now the flow of information beginning at the light source 12, the plurality of parallel light rays 36 are directed toward the translucent panel 14, which they cause to be fully illuminated except for those areas where the rays are blocked by a foot placed upon the foot placement panel 23, in which case an exact shadow of the foot appears on the panel 14 which is also visible on the bottom surface of the panel 14 and is in the field of view of the lens assembly 34 which then focuses the image through the optical means 18 onto the surface of the light sensitive array 20.

The light sensitive array 20 divides the field of view into 32,768 discrete images, referred to as pixels, which provides a resolution of approximately twice that which is deemed sufficient for accurate foot measurements by those knowledgeable in that field. Devices of greater resolution would have no additional value but of course could be used if economy or practicality made their use desirable.

Each discrete pixel is interrogated to determine its light or dark status by setting an address bus 38 to a combination of logical "ones and zeros" which represents the "address" (or number) of the pixel of interest and then activating signals on a control bus 40 from the microcomputer 22 as required, typically involving a "read" and "output enable" function. The above sequence "reads" the status of a single pixel or "bit" at the single output terminal of the array 20 and it is a function of the array scanner 21 associated with the light sensitive array 20 to save these single bits of status until a number of bits which represents a "word" is accumulated and then to output that word of status bits onto a data bus 42 where the word can be acquired by the microcomputer 22 for processing.

The above sequence will be fundamental to those trained in computer technology and they will recognize that the number of "bits" in the "word" referenced above is only a matter of a particular computer's architecture and is not germane to the present invention. It will also be apparent that the functions required of the microcomputer 22 are typical of all microcomputers and that the concepts presented herein are not dependent upon any specific type microcomputer.

After the light sensitive array 20 has been scanned and the status of all pixels has been acquired by the microcomputer 22, various algorithms may be applied to the data to enhance the image by smoothing the outline, reducing or eliminating the effects of "noise" or other unwanted optical aberrations. The smoothed outline is then suitably processed, sorted or otherwise converted into data to allow convenient correlation to a properly fitting shoe size by still another algorithm.

The entire sequence of operation and execution of the various algorithms are controlled by software which is resident within the microcomputer 22 and which is called into action automatically, internally by the microcomputer itself or manually by commands from the peripheral I/O device 24.

Images and or data as desired can be output to the I/O device 24 or to the video ram 32 and display processor 33 for storage and conversion to the signal form required by the video display device 26.

The functions of the video ram 32 and display processor 33 are opposite to, but very similar to the functions of the light sensitive array 20 and associated scanning functions accomplished by the microcomputer 22 in that they accept words of video data from the data bus as directed by signals from the control bus and store the video data in the video ram memory 32 where the data are then read or accessed as individual bits by the display processor 33 and are then output to the video display 26 as individual pixels again where they can be viewed.

It is assumed that the function of the video display itself is apparent to one skilled in the art and requires no further explanation.

Figure 4:
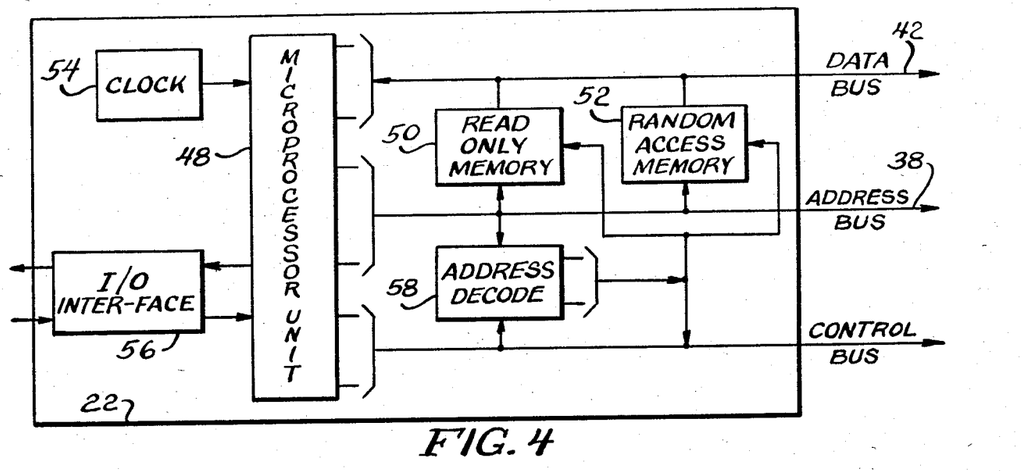
FIG. 4 is a more detailed functional block diagram of the microcomputer of FIG. 3 showing internal components that comprise the "brains" of the present invention.

Turning now to the microcomputer block diagram of FIG. 4, a person skilled in the art will recognize the microcomputer 22 of FIG. 3 comprising the basic functions of a microprocessor unit (MPU) 48, read only memory (ROM) 50, random access memory (RAM) 52, clock 54, I/O interface 56, and address decoder 58 and being connected to the 3 standard buses; the data bus, the address bus, and the control bus. The control bus contains read, write, enable and select signals as needed to inform external devices what function the MPU 48 is presently performing.

The microcomputer 22 internal data bus is a bidirectional path which allows the MPU 48 to acquire or "read" information from the ROM 50 and RAM 52 or any other peripheral device connected to it, or conversely to allow the MPU 48 to output or "write" data to the internal data bus for receipt by the various external devices.

Typically, the MPU outputs simultaneously with data, a logical combination of bits to the internal address bus which indicate to which device the internal data bus information is directed to or requested from.

The address decoder 58 recognizes the various combinations on the internal address bus and provides device or "chip select" signals on the internal control bus which activate the proper device so that it can respond as directed by the MPU 48 internal control bus signals to read or write data on the internal data bus. The address bus information also indicates which memory word or location within the device is to be read from or written to.

The MPU provides read or write signals to the internal control bus which inform the device selected by the "chip select" signals whether to read or write data on the internal data bus.

The clock 54 provides a continuous stream of very accurately timed pulses which the MPU 48 uses to synchronize all of the internal and external events and thus control what happens and when it happens.

The I/O interface 56 may take any one of several forms depending on the details of the final implementation. It may provide a set of bidirectional amplifiers to isolate the MPU 48 from the I/O device 24 or it may change the format of the data from parallel "bytes" to serial bits in accordance with standard practice in the industry (typically RS-232/C). The selection of a particular type MPU chip from the many available types, and the type of I/O device, will ultimately determine the exact form and function of the I/O interface 56.

A skilled engineer will recognize that the functions of the microcomputer 22 of FIG. 4 are typical of today's computer technology and all or a part of these functions may be contained within a single monolithic integrated circuit. It follows that the invention presented herein can take full advantage of present and future microelectronic evolutions to perform the functions required of the basic concept.

It should be noted here that many of the implementation details and algorithms are contained within the software resident in the ROM 50 and that modifications to that software or to the form of storage would have to be significant and substantial before departing from the invention described herein.

Figure 5:
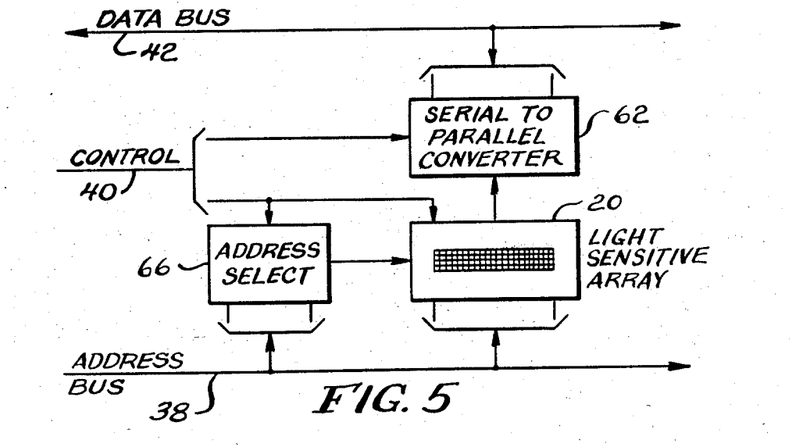
FIG. 5 is a more detailed functional block diagram of the light sensitive array and scanning means. The interconnections to the microcomputer of FIG. 4 are also depicted to show the flow of information and control signals.

An expanded diagram of the light sensitive array and array scanner is presented in FIG. 5 wherein a serial to parallel converter 62, the light sensitive array 20 and address select logic 66 are depicted.

The address select logic 66 combines the address bus 38 signals with control bus 40 signals to generate signals which cause the light sensitive array 20 to output a signal which indicates the light or dark status of a single light sensitive cell or pixel.

The serial to parallel converter 62 performs the function of committing a small number of bits to memory which saves the status of each pixel as it is read from the light sensitive array 20 until a number of them which constitutes a "word" has been accumulated and at which time the contents of the converter 62 are read by the MPU 48 (FIG. 4) and the process is repeated, thus effecting serial to parallel conversion.

Figure 6:
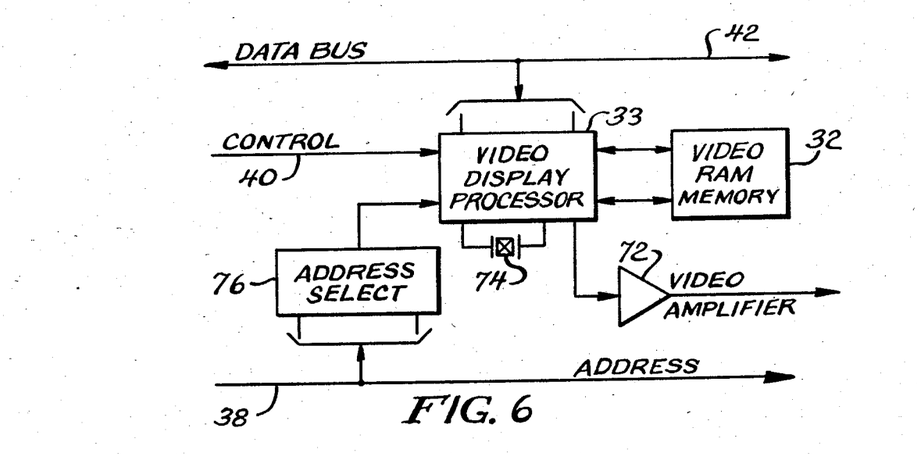
FIG. 6 is a more detailed functional block diagram of the video RAM and display processor. Again, the interconnections to the microcomputer are shown to indicate flow of information and control signals.

The video ram 32 and video display processor 33 are depicted in greater detail in FIG. 6 and further comprise the video display processor 33, the video ram memory 32, a video amplifier 72, a quartz timing crystal 74 and address select logic 76.

The video display processor 33 generates all the required video, control and synchronization signals to maintain a 256 by 192 pixel display on a television type monitor. The display processor 33 is available as a single integrated circuit or can be purchased as part of a functional block with video ram included. The video ram memory 32 is used to store the light/dark status of each display pixel where it can then be read by the video processor 33, which then formats and synchronizes the signal and sends it through the video amplifier 72 to the video display 26 of FIG. 3. The video amplifier 72 serves the dual purpose of power amplification and matching the impedence of the display processor 33 to the video display 26 of FIG. 3. The quartz crystal 74 serves as the tuning element for the timing circuits which synchronize the signals to the television type video display.

The image in the video ram memory 32 and thus the video display itself is changed as desired when the microcomputer 22 (FIG. 3) executes a series of write operations to addresses which correspond to the location of each pixel to be displayed. This operation is analogous to the microcomputer writing data to other memory devices using the three internal buses (data, address, and control), with the video ram and display processor being selected by the address select logic.

The following description is presented in several sections so as to better relate the schematics of FIGS. 7-10 to the block diagrams of FIGS. 1-6.

Section One will locate and define the microcomputer and related functions of FIG. 4.

Section Two will locate and define the light sensitive array of FIG. 5 and its related functions.

Figures 10, 11:
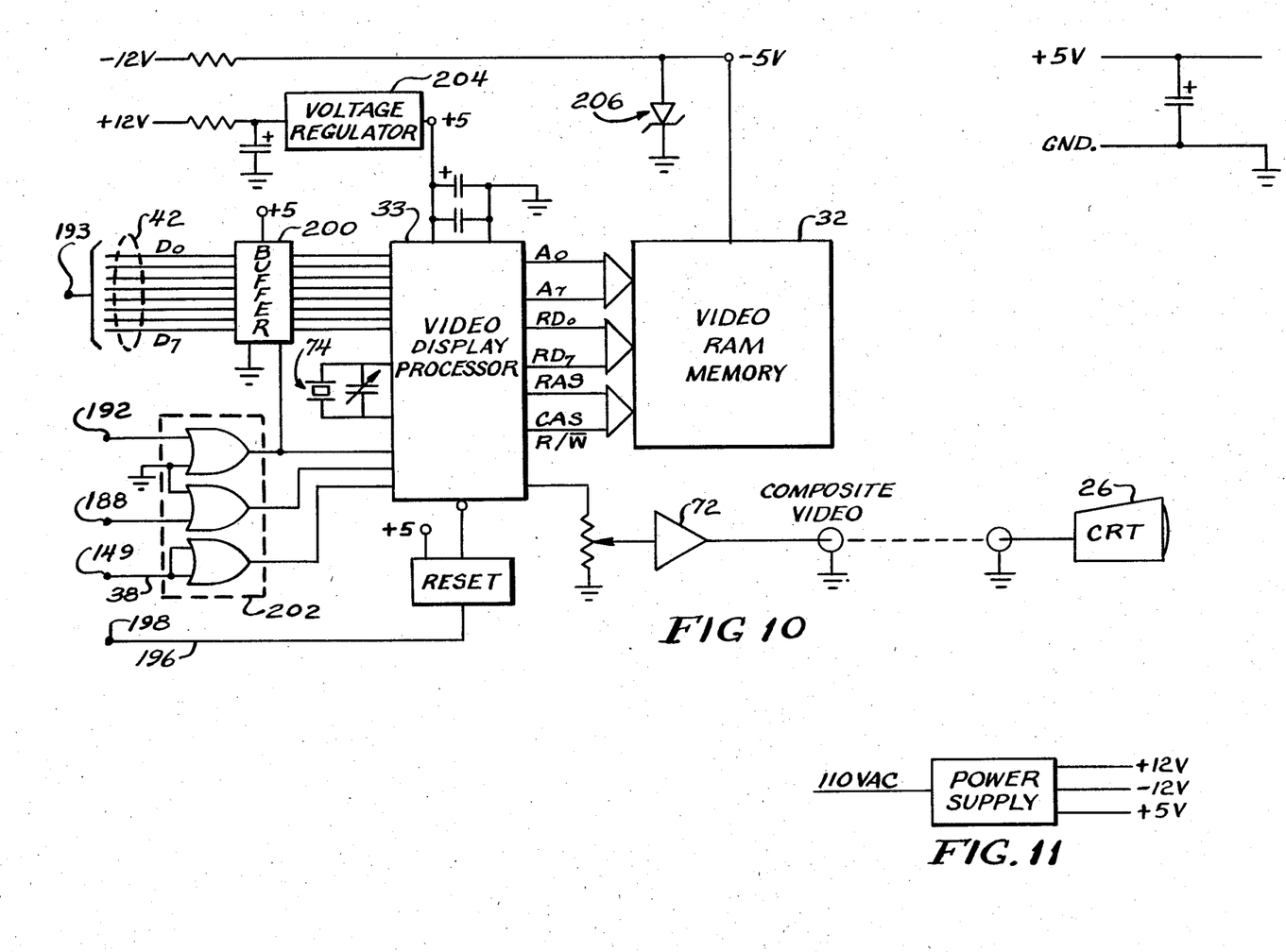
FIG. 10 is a schematic diagram depicting specific hardware for operation of the video RAM and display controller shown in FIGS. 3 and 6.
FIG. 11 depicts the manner in which standard line voltage power is converted to appropriate values for operating the electronics of the invention.

Section Three will describe the functions related to the video RAM and display processor of FIG. 6 and additional details of this device as presented in the separate schematic of FIG. 10.

Section Four will trace the flow of signals and information (data) through the system and describe how the objects of the invention are accomplished.

Section Five will describe the function of various additional devices not related to the present invention.

SECTION ONE

Figure 7:
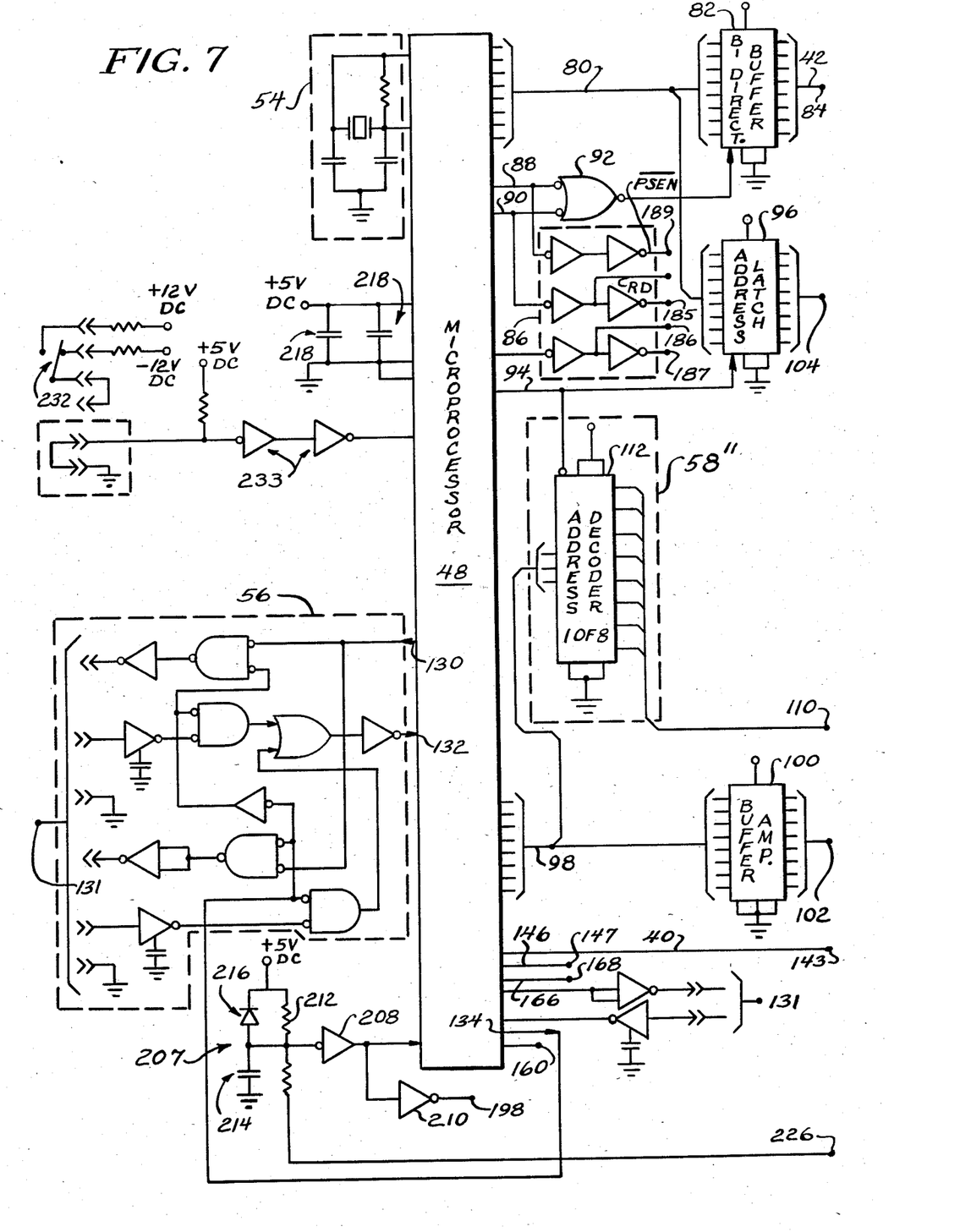
FIG. 7 is a portion of an overall schematic diagram depicting specific hardware for operation of the basic invention shown in FIGS. 1-6. Dotted lines have been drawn to represent functions disclosed in FIGS. 4-6.

The microprocessor (48 of FIG. 4) is wholly contained within the integrated circuit 48 of FIG. 7. Some of the signals into and out of the MPU (microprocessor unit) of FIG. 7 require some additional conditioning circuitry before they can be correctly related to the signals of FIGS. 4, 5 and 6. One of the reasons for this conditionihg is that because these signals are used by many devices within the system, they must be amplified or "buffered" so they have sufficient power to drive all the circuits using them. Conditioning is also required to establish the proper timing and logic relationship required by the various peripheral devices of the system.

Eight bits of bidirectional data are input to and output from the MPU 48 of FIG. 7 via line 80 and are buffered by bidirectional buffer 82 of FIG. 7. The output of this buffer at point 84 comprises the data bus 42 of FIGS. 7-10 and of FIGS. 4, 5 and 6. Since a buffer can only amplify signals in one direction at any one instant and since the data bus signals are bidirectional, the buffer 82 must be of the bidirectional type.

Control bus 40 is the name applied to a group of signals which are not part of the data bus or of the address bus but are used to control the logic status of various devices as required. Therefore the control bus signals are shown throughout the schematic in various places rather than as a group as is the data or address bus, and as a whole, make up the control bus 40 referred to in FIGS. 4, 5 and 6. These signals are buffered by inverters 86 and are distributed throughout the system.

Control bus signals PSEN on line 88 and RD on line 90 are output from the MPU 48 to inform the data buffer 82 which direction data will flow. These are combined in an OR circuit 92 so that the buffer will be set to the READ mode and input data to the MPU 48 whenever PSEN or RD is in a logical 0 or low state. Of course, when neither is low, the buffer is in the WR (write) state and will buffer signals output by the MPU. These eight buffered data bits comprise the data bus 42 of FIGS. 4-10. The PSEN buffered signal at point 189 is applied to the ROM of FIG. 9.

The MPU is preferably an 8031 type produced by INTEL and uses the common time multiplexed data-/address bus technique, which means that the eight least significant bits (LSB) of the address are actually output from the same connections as the eight data bits but at a time prior to outputting the data bits. This means that the MPU must provide a control bus signal to other circuits so they can know when the signals on the data bus 42 represent data or address information.

The MPU 48 outputs a signal called ALE on line 94 or Address Latch Enable, which does just that. The ALE on line 94 causes an address latch 96 to memorize and buffer the eight LSB of the address so they can be combined later with the eight MSB of the address to form a complete sixteen bit address bus.

The eight MSB on line 98 of the address are output by the MPU to a buffer amplifier 100 for the same reason as the data bits. This buffer amplifier 100 however need not be bidirectional since the address signals are always output by the MPU and therefore require no logic signal to control the direction of amplification (it is always active). These eight MSB are output by the buffer amplifier at point 102 and combined in FIG. 8 in address decoder 58' with the eight LSB from the address latch 96 appearing at point 104 to form the sixteen bit address bus 38 referred to in FIGS. 4–10 and appearing at the output of address latch 96.

Figure 8:
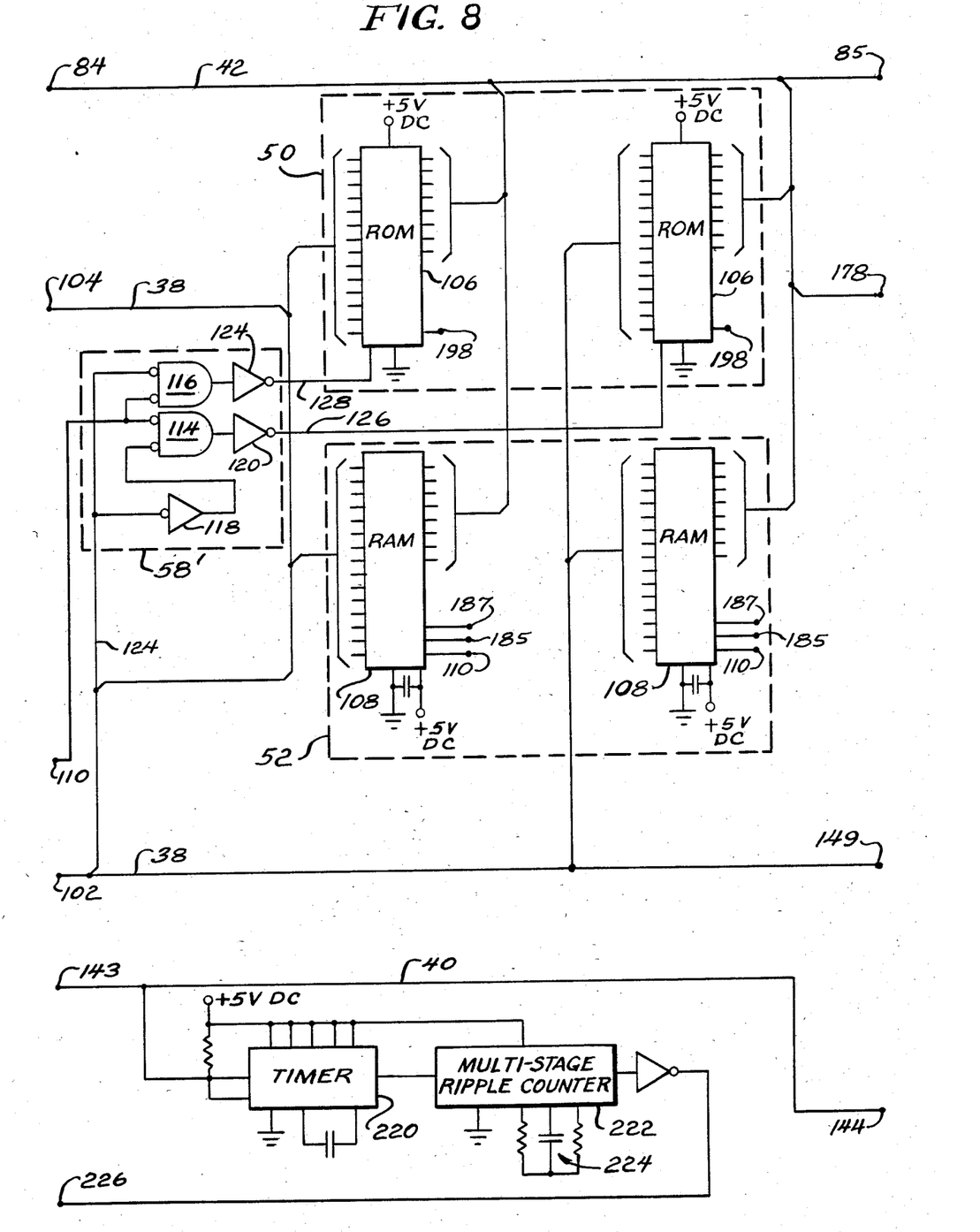
FIG. 8 is an additional portion of an overall schematic diagram depicting specific hardware for operation of the basic invention in FIGS. 1-6. Dotted lines have been drawn to represent functions disclosed in FIGS. 4-6.

The read only memory 50 of FIG. 4 is implemented by a pair of identical ROM devices 106 shown in FIG. 8 of the industry standard UV eraseable 2732 type and each can store a total of 32k bits (32×1024) or 4k bytes of program instructions.

When properly commanded by the MPU via the address and control bus acting on decoder 58′, these devices will output instructions to the data bus 42 to be read and executed by the MPU 48. Which instructions are output is determined by the address data present on the address bus at that time.

The computer's need for a place to temporarily store variable data is satisfied by random access memory 52 (RAM) devices 108 comprising a pair of the 2186 type. Each of these devices can store up to 8K bytes (8×1024) of variable data. Where the data is stored or read from is again determined by the address data present on the address bus 38 at the time a read (RD) or write (WR) control signal appearing at points 185 or 187, respectively, is output from the MPU. The RD or WR signal, of course, also controls the direction of data flow into or out of the RAM 52.

The address decode function 58 of FIG. 4 is accomplished by decoding the three most significant bits of the address bus 38 into eight groups of 8K each (8×1024). The eight control signals appearing at point 110 representing each group is then generated by the one of eight decoder 112 which is referred to as CS0 through CS7 which means "chip select" 0 through "chip select" 7.

The logic circuit 58′ (a portion of address decoder 58) comprising AND circuits 114 and 116 and inverters 118, 120 and 122 combine with address bit 12 (A12) on line 124 to further divide CS0 into two groups of 4K each represented by CEA and CEB appearing on lines 126 and 128, respectively, which are control signals used to select which of the two ROMs 106 is enabled.

The clock circuit 54 of FIG. 4 as shown in FIG. 7, consists of two capacitors, one resistor and a crystal which combine with circuitry internal to the MPU to form a 7.3728 MHZ oscillator which provides the timing base for all events within the system.

The I/O interface 56 of FIG. 4 as shown in FIG. 7, is implemented by a group of logic circuits connected to the transmit (TXD) and receive (RXD) ports 130 and 132, respectively, of the MPU which convert the TTL level signals to and from the MPU to the standard RS-232C signals at point 131 and also steer the signals to an external (not shown) CRT terminal or printer as determined by the logic state of the signals from the MPU port connection 134. The terminal or printer serves as the input or output device by which commands and instructions are entered into the system and by which results are output from the system for further processing and analysis.

SECTION TWO

Figure 9:
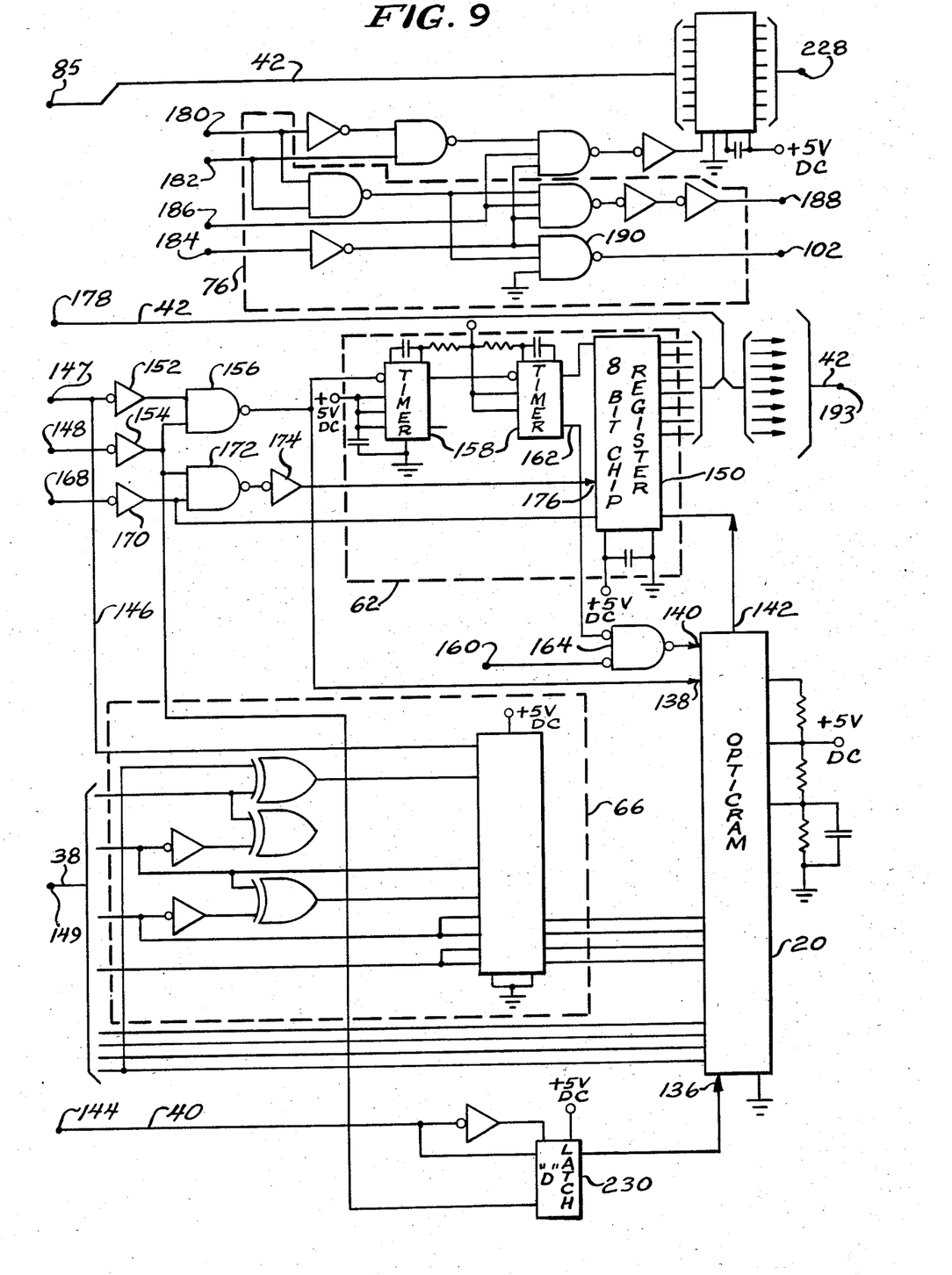
FIG. 9 is an additional portion of an overall schematic diagram depicting specific hardware for operation of the basic invention shown in FIGS. 1-6. Dotted lines have been drawn to represent functions disclosed in FIGS. 4-6.

It is an important feature of the invention that the light sensitive array 20 of FIG. 5 is as shown in FIG. 9 and is preferably an IS32 "OpticRAM" ™ supplied by Micron Technology, Inc. This device is functionally equivalent to a standard dynamic RAM except it has a transparent lid over the microcircuit which allows light energy to enter and since the individual cells of a dynamic RAM are photosensitive, the electrical energy stored in the cell is proportional to the amount of light energy falling on that cell. The light or dark status of each cell can be determined by addressing that particular cell in the same manner as any other dynamic memory device and pulsing the chip Row Address Strobe (RAS) 136 and the chip Column Address Strobe (CAS) 138 to latch the address internally and then cycling the Write Enable (WE) 140 from low to high and back to low again. The status of the addressed cell will then be present at the output pin 142 until the next read cycle. The array actually consists of two separate arrays of 32,768 cells each, but since there is a physical separation between them which would cause a dead spot, only one array is used. Each array is made up of a matrix of 128×256 cells but the physical placement of the cells within the array does not correspond to a logical progression of addresses so the address select logic shown as 66 of FIG. 5 has to be arranged to descramble the configuration so the data can be accessed as a logical sequential matrix. The MPU generates control bus signals 40 at points 143 and 147 of FIG. 7 which consist of a System Row Address Strobe (RAS) 144, a System Column Address Strobe (CAS) 146 at point 147 and a System Read (RD) 148 pulse and address bus signals appearing at point 102 in FIGS. 7 and 8 and point 149 in FIGS. 8 and 9. These control bus signals are activated by the MPU as required to access the array to gather data and to refresh the cells periodically to maintain stable data.

Since the cell data is read one cell at a time, and the MPU reads data eight bits at one time, it would be more efficient to accumulate the cell data on output pin 142 in the serial to parallel converter 62 of FIGS. 5 and 9. This function is provided by a type 4094 eight bit shift register 150 which accepts the data one bit at a time and stores it sequentially each time the array 20 is read as directed by control bus system signals CAS 146 and RD 148, the coincidence of which is detected by inverters 152 and 154 and NAND circuit 158 to start a timing sequence controlled by timers 158 of converter 62. It is the conclusion of this timing which causes the converter 62 to store the data sequentially immediately after it is read from the array 20. The array read cycle is initiated by the coincidence of low signals from the MPU port 160 and the output 162 of timers 158 as detected by the AND circuit 164, the output of which is supplied to the read/write control of the array.

The eight bits of parallel data is read from the converter 62 when coincidence is detected between the Data Strobe 166 at point 168 and a RD pulse at point 148 through inverters 154 and 170 by NAND circuit 172 and again inverted by inverter 174 before being applied to the enable input 176 of the converter, which then outputs the eight bits of data to the data bus 42 through point 178 where it can be acquired by the MPU 48.

SECTION THREE

The video functions of FIG. 6 are shown in detail in FIG. 10 and are preferably provided by a functional package as manufactured by Ironics Inc. under their part number IS-CVP-1. The package supplies all functions of FIG. 6 except the address select logic which is shown in FIG. 9 which is there performed by the logic combination of NAND circuits and inverters. The address select logic 76 thus causes a write cycle to video RAM 32 (FIG. 10) and video display processor 33 when address A11 or A12 appearing at points 180 and 182 of the address bus 38 is low at the same time the control bus makes point 184 low and point 186 high to produce a low signal at point 188 into the Ironics board of FIG. 10. Since one input of NAND circuit 190 is connected to ground, the output of that NAND at point 192 is always high and the RD function of the Ironics board is disabled. Thus the MPU 48 can only write video data to the display but there is no need to read video data from it. Address bit A0 194 comprising one line of address bus 38 at point 149 informs the Ironics board whether the data it is about to recieve is video data for display or command data to set the initial operating parameters of the board. This is done when power is first applied to the system. An input signal called RESET or 196 is generated at point 198 when power is first applied which is also conveyed to the Ironics board to initialize the circuits of that sub-system.

FIG. 10 presents a slightly simplified schematic of the Ironics IS-CVP-1 Video RAM and Display Processor which is provided a complete and functional assembly to provide the functions described as 32 and 33 in FIG. 6. Also included on this printed circuit board are the clock 74 and video amplifier 72 referred to in FIG. 6.

The heart of the assembly is the type 9918A Video Display Processor preferably as manufactured by Texas Instruments Inc., and is actually a complete microprocessor in itself and is dedicated to the task of producing the signals required to cause an image to appear on the screen of an external video display 26 of FIGS. 6 and 10.

The processor has its own dedicated bus structure comprising the address bus A0 through A7, the data bus RD0 through RD7 meaning RAM Data 0 through RAM Data 7 and a control bus consisting of a Row Address Strobe (RAS), a Column Address Strobe (CAS) and a Read/Write (RD/WR) signal.

The processor 33 has its own internal ROM which contains a program which causes it to generate and synchronize all the timing signals in the proper sequence and combine them with the signals which represent the video image to be displayed, into a signal called composite video which meets all the requirements of the external video display 26 which also conform to the industry standard requirements for television receivers. This composite signal is amplified by a video amplifier 72 to provide the proper power level and to match the impedance characteristics of the coaxial cable which carries the video signal to the video display 26. The level of the video signal is adjustable to compensate for any cable losses or component variations.

The image that the video display processor 33 causes to be displayed is determined by the contents of the video RAM 32 which the video display processor accesses using typical computer techniques and the dedicated buses.

The video display processor 33 communicates with the system MPU 48 via the system data bus 42 at point 193 and a bidirectional buffer 200 (74LS245) which provides the required signal conditioning. The direction of amplification is determined by the RD signal at point 193 through the OR circuit 202 (74LS32). The information exchanged between the video display processor 33 and the MPU 48 include mainly the video image to be displayed and secondly, control and status information relating to the operation of the video display processor 33. When the MPU 48 is writing information into the video display processor 33, the write signal (CSW) at point 188 will inform the video display processor through the OR circuit 202 that the information is ready for it to receive. Address bit A0 194 at point 149 of the system address bus 38 informs the video display processor whether the data bus 42 information is video information to be displayed or control signals to vary the operation of the video display processor 33. When the system is first energized, a control bus signal 196 called reset is supplied to the reset circuit which then resets the video display processor 33 and causes it to start operation at the beginning of the program stored in the internal ROM of the video display processor 33.

A separate +5 volt power source for the video display processor 33 is derived from the +12 volt source through the type 7805 voltage regulator 204. This helps to isolate the video display processor 33 from the rest of the system and prevent its high frequency signals from disturbing the other parts of the system.

A separate −5 volt source for the video RAM 32 is derived from a −12 volt source and regulated by a zener. diode regulator.

The rest of the circuit board is powered by the system +5 volt power source.

SECTION FOUR

Tracing the flow of control signals and data through the system begins with the application of system power whereupon a system RESET signal is generated at point 198 by a reset circuit 207 shown in FIG. 7 and comprising inverters 208 and 210, resistor 212, capacitor 214 and diode 216. When power is first applied, capacitor 214 has no charge and presents a logical low signal to the inverter 208 which in turn provides the logical high required to reset the MPU 48 and inverter 210 inverts that signal for the video circuits that require a logical low signal for reset. As time progresses, capacitor 214 charges towards the supply voltage through resistor 212 and at some point reaches a voltage which is interpreted as a logical high and the system reset is removed. Diode 216 provides a rapid discharge path when power is removed and also prevents the voltage at that point from exceeding a diode drop greater than the power supply which would occur as power is decaying after turn off. This could damage the inverter.

After reset is accomplished, the MPU starts fetching instructions from the ROM 106 and executing them as required by the software therein contained. Ultimately, the program reaches a point where it directs the light sensitive array 20 to output serial data (one bit at a time) representing the image it is receiving to the serial to parallel converter 62 whereupon the data is converted to eight bit words which are then output to data bus 42. Under program direction, the MPU then initiates a read cycle and acquires the data. The data is then output to the RAM 52 where it is stored until the entire image is acquired. The MPU then reads the RAM 52 data and processes it according to an algorythm which is part of the ROM 50 program to optimize and format the data so it is ready for the external co-processor 24 or manual operator to further analyze the data to determine an optimum shoe size.

SECTION FIVE

FIG. 11 depicts a power source which is controlled by a main switch (not shown) which when operated supplies a nominal 115 volts AC to a group of power converters and regulators commonly referred to as power supplies and which convert the 115 volts AC to +12 volts and +5 volts DC which is distributed throughout the system to power the various devices as required.

Several of the integrated circuits have one or more capacitors shown connected between +5 volts and ground. These capacitors are known to those skilled in the art as decoupling capacitors and are used to provide local sources of instantaneous power and thereby prevent these surges of power from disrupting operation of nearby circuits. Reference Numeral 218 of FIG. 7 provides but one example of these capacitors.

Similarly, several integrated circuits also have resistors connected from +5 volts to one or more input pins and perform the function known as "pull ups" which means to literally pull that pin up to +5 volts through an impedance so that if required, other circuits can pull that point back down to ground and the current thus drawn will be limited by the value of the resistor. This technique is also used to insure that unused inputs have a definite logic signal rather than not being connected. Again, these are well known to those skilled in the art.

What is known as a "watch dog circuit" comprising a timer 220 and a multistage ripple carry counter 222 is shown in FIG. 8. The resistor and capacitor network 224 connected to the ripple carry counter 222 causes the counter to act as an oscillator and count its own oscillations. If the counter accumulates enough counts to ripple through to its output, a reset signal will be generated at point 226 and cause the MPU 48 to start operation from the very beginning again, thus correcting malfunctions which cause the MPU 48 to lose control of the operating sequence. Proper operation of the system produces input pulses to the timer 220 which then times out and resets the counter thus preventing the system reset signal from being generated. Use of this watch dog circuit is optional but improves system reliability.

An additional parallel output port 228 is designed into the system and driven by the data bus for purposes such as an additional printer or plotter.

A "D" latch 230 of FIG. 9 is used to synchronize the RAS and RD signals appearing on the control bus 40 into the Optic RAM 20.

The logical low signal supplied to the MPU 48 through inverters 233 informs the MPU 48 that an external printing device is installed for test purposes and the software responds accordingly.

An external pushbutton switch 232 is provided to supply a + or −12 volt signal to inform the peripheral device 24 that a measurement cycle has started.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. Apparatus for measurement of foot size comprising light sensitive array means comprising plural individual light sensitive elements,
    means for imaging the foot to be measured upon said light sensitive array means to thereby effect the storage of electrical energy in individual ones of said plural light sensitive elements,
    microprocessor means connected at an output thereof through address select logic means to an input of said light sensitive array means to direct the sequential reading of the output of said individual light sensitive elements thereof,
    video display means for displaying the image of said foot in response to the output of said light sensitive array means, and
    data bus means for transmitting said output of said light sensitive array means to said microprocessor means and said video display means.

2. Apparatus for the measurement of foot size in accord with claim 1 wherein said light sensitive array means comprises an opticRAM dynamic random access memory.

3. Apparatus for the measurement of foot size in accord with claim 1 wherein said microprocessor means includes program storage means.

4. Apparatus for the measurement of foot size in accord with claim 3 wherein said program storage means comprises read only memory devices.

5. Apparatus for the measurement of foot size in accord with claim 3 wherein said storage means are connected to said microprocessor means through bidirectional buffer means and are responsive to address data signals from said microprocessor means.

6. Apparatus for the measurement of foot size in accord with claim 4 wherein said storage means are connected to said microprocessor means through bidirectional buffer means and are responsive to address data signals from said microprocessor means.

7. Apparatus for the measurement of foot size in accord with claim 1 wherein the said output to said address select logic means consists of a system row address strobe, a system column address strobe and a pulse whereby said address select logic means provides an output to direct access to said light sensitive array means as a logical sequential matrix.

8. Apparatus for the measurement of foot size comprising
    light sensitive array means comprising plural individual light sensitive elements,
    means for imaging the foot to be measured upon said light sensitive array means to thereby effect the storage of electrical energy in individual ones of said plural light sensitive elements as determined by said image of the foot thereon,
    microprocessor means connected at an output thereof through address select logic means to an input of said light sensitive array means to direct the sequential reading of the output of said individual light sensitive elements thereof,
    video display means for displaying the image of said foot in response to the output of said individual light sensitive elements,
    data bus means for transmitting said output of said individual light sensitive elements to said microprocessor means and said video display means, and
    means connected to said microprocessor means and responsive to the foot image information at the output thereof to determine a specific shoe size for the imaged foot.

9. Apparatus for the measurment of foot size comprising
    light sensitive array means comprising plural individual light sensitive elements, means for imaging the foot to be measured upon said light sensitive array means to thereby effect the storage of electrical energy in individual ones of said plural light sensitive elements as determined by said image of the foot thereon, microprocessor means connected at an output thereof through address select logic means to an input of said light sensitive array means to direct the sequential reading of the output of said individual light sensitive elements thereof to thereby provide data at the output of said light sensitive array means indicative of the image of the foot thereon, video display means for displaying the image of said foot in response to the output of said individual light sensitive elements, data bus means for transmitting said output of said individual light sensitive elements to said microprocessor means and said video display means, and means connected to said microprocessor means and responsive to the foot image information at an output thereof to determine a specific shoe size for the imaged foot.

10. In an apparatus for the automatic measurement of foot size and the display thereof comprising light sensitive array means, means for imaging a foot to be measured on said light sensitive array, microprocessor means including program storage means connected through address select logic means to an input of said light sensitive array means to direct the readout therefrom of data indicative of the image of the foot thereon and video display means for displaying the image of the foot to be measured and foot size, the improvement comprising an opticram dynamic random access memory logically accessed by said microprocessor means through address select logic means whereby the output thereof is a logical sequential matrix.

11. In an apparatus for the automatic measurement of foot size and the display thereof comprising light sensitive array means, means for imaging a foot to be measured on said light sensitive array, microprocessor means including program storage means connected through address select logic means to an input of said light sensitive array means to direct the readout therefrom of data indicative of the image of the foot thereon and video display means for displaying the image of the foot to be measured and foot size, the improvement comprising an opticram dynamic random access memory logically accessed by said microprocessor means through address select logic means whereby the output thereof is a series logical sequential matrix, and shoe size determining logic means, connected and responsive to said series logical sequential matrix at its input determines the specific shoe size for the imaged foot.

12. A method for measurement of foot size comprising the steps of placing a foot upon positioning means, imagining said foot upon a light sensitive array, sequentially reading of the image on said light sensitive array to form a logical sequential matrix signal, and processing and comparing said matrix signal to determine a specific shoe size.

13. A method for measurement of foot size as claimed in claim 12 comprising the step of transmitting said matrix signal to video display means.

14. A method for measurement of foot size as claimed in claim 13 comprising the step of displaying said specific shoe size on said video display means.

15. A method for measurement of foot size as claimed in claim 12 comprising the step of transmitting said matrix signal means to microprocessor means, and to video display means, and displaying said specific shoe size on said video display means.

* * * * *